United States Patent [19]

Ta

[11] Patent Number: 4,803,459
[45] Date of Patent: Feb. 7, 1989

[54] ELECTRONIC MULTI-PURPOSE WARNING DEVICE FOR MOTOR VEHICLES AND MOTOR BOATS

[76] Inventor: S. Henry Ta, 6240 E. Tamgrind, Agoura, Calif. 91301

[21] Appl. No.: 38,002

[22] Filed: Apr. 14, 1987

[51] Int. Cl.⁴ .................. B60Q 1/00; G08B 21/00
[52] U.S. Cl. .................. 340/52 R; 340/636; 340/657; 340/693; 324/426; 324/433; 320/48; 320/31
[58] Field of Search .......... 340/52 R, 635, 636, 340/657, 660–664, 693, 514; 324/426, 433; 320/30, 31, 48

[56] References Cited

U.S. PATENT DOCUMENTS

| | | | |
|---|---|---|---|
| 3,118,137 | 1/1964 | Vincent | 340/249 |
| 3,568,175 | 3/1971 | Schwein | 340/249 |
| 4,028,616 | 6/1977 | Stevens | 324/433 |
| 4,068,216 | 1/1978 | Brouwer et al. | 340/168 R |
| 4,320,383 | 3/1982 | Lumbroso | 340/71 |
| 4,488,110 | 12/1984 | Shirey et al. | 324/433 |
| 4,521,735 | 6/1985 | Kageyama et al. | 324/426 |
| 4,659,994 | 4/1987 | Poljak | 340/636 |
| 4,665,370 | 5/1987 | Holland | 340/636 |

Primary Examiner—Donnie L. Crosland

[57] ABSTRACT

A device to be used in a motor vehicle or motorboat for performing a wide variety of warning and monitoring functions. It includes apparatus to electrically connect to a positive battery cable (1,2), to a negative battery cable (3,4), and to the vehicle chassis (5,6); apparatus for warning sound and light (7,8); an electronic circuitry (9); and a cigarette-lighter size plastic enclosure (10). The electronic circuitry includes a Voltage Sensing Circuit to sense the battery voltage and battery cable connection conditions at engine starting and to turn on warning sound and light on low battery and bad battery connection detection, a Current Sensing Circuit to sense the battery discharge current and to turn on intermittent or continuous said warning sound on detection of a left-on headlight a battery charging system malfunction or failure, brake light failure, and too-low engine idle speed. The device can be attached to a battery cable and requires no skill and no tools for installation according to FIG. 1. As such, the device user can avoid booster cables, or tow truck calls due to battery troubles, and reduce the risk of rear end collisions.

18 Claims, 1 Drawing Sheet

BLOCK DIAGRAM OF 9

//US. Patent  Feb. 7, 1989  4,803,459
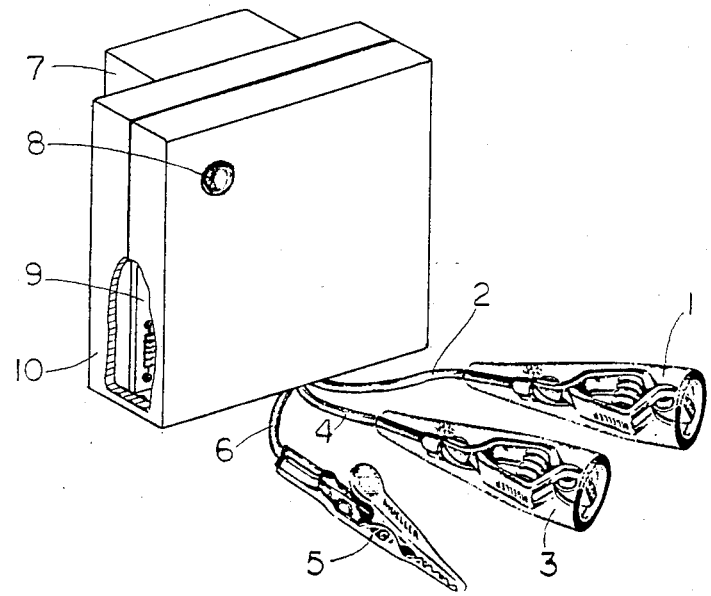
FIG.1  PERPECTIVE VIEW
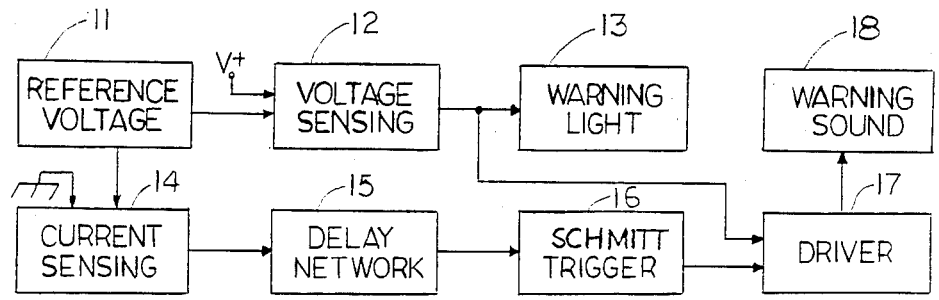
FIG.2  BLOCK DIAGRAM OF 9
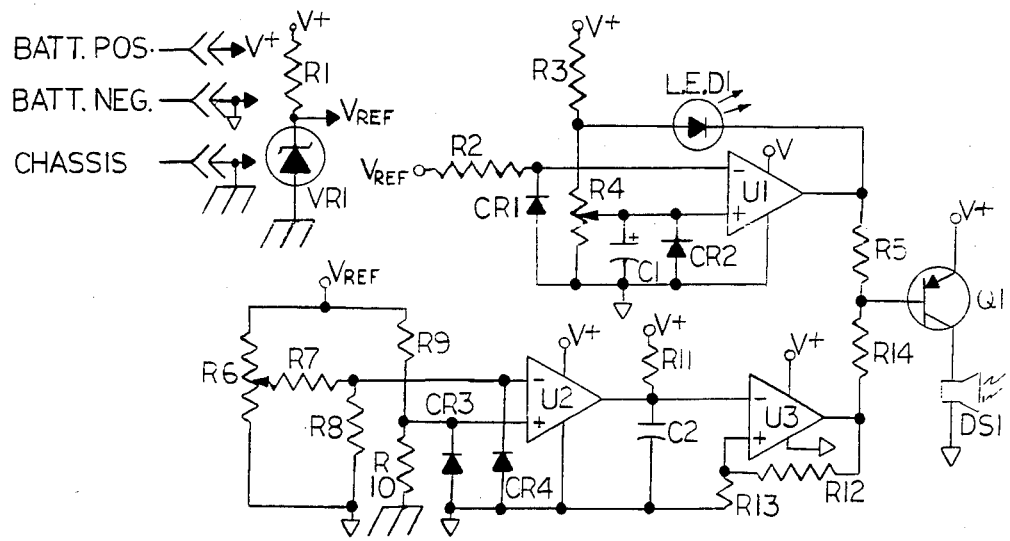
FIG.3  CIRCUIT SCHEMATIC OF 9

ELECTRONIC MULTI-PURPOSE WARNING DEVICE FOR MOTOR VEHICLES AND MOTOR BOATS

BACKGROUND

1. Field of the Invention

This invention relates to electronic warning devices used in a motor vehicle or motorboat to warn the driver in case of abnormal usage, malfunction or failure of different electrical functions and electrical parts, including lighting functions, battery, battery charging system, related interconnected wires and cables.

2. Description of Prior Art

The main function of a rechargeable storage battery used in any nonelectrical motor vehicles or motorboats is to start the engine, or, in case of an electrical motor vehicle, to run the motor. If the battery charge is not adequately maintained, the engine can not be started, and drivers must inconveniently use booster cables to temporarily connect an external good battery to their vehicle for an engine starting. Most drivers have to rely on the service of a tow truck to solve the problem.

Heretofore, different built-in devices or means have been incorporated in a motor vehicle to help drivers to avoid the above battery problems. Some vehicle manufacturers provided a battery voltage indicating voltmeter. Some other used an illuminated warning sign to display troubles in the battery charging system. In some cars, a warning sound or even a warning voice has been used to particularly warn the driver that the car headlamps are being left on while the engine is not running.

However, no matter what means the manufacturers are using, said warning means were already built-in and internally wired with the existing system, thus likely forcing drivers to change to or purchase another vehicle in order to have said warning means.

Therefore, most drivers, especially the ones whose vehicles or boats are not equipped with said warning means, would find it more desirable to have a install-it-yourself warning device that could provide a muct better if not a full battery protection and monitoring of electrical functions, so that they can save time and money, and the inconvenience of using booster cables or calling a tow truck.

OBJECTS AND ADVANTAGES

Accordingly, I claim the following as my objects and advantages of the invention: to provide an electronic device for using in a motor vehicle or motorboat with multiple warning functions, namely headlamps on warning, low battery warning, battery charging system malfunction warning, inoperative battery charger warning, brake light failure warning, bad battery connection warning; to provide an audiovisual warning means to easily and efficiently attract driver attention; and to provide such a device which requires no skill or no tools to install, and which is so light that it can be attached even to a battery cable.

In addition, I claim the following additional objects and advantages: to provide a device with a warning sound that is loud enough to attract driver attention, but also is weak enough to not bothering nearby people; to provide such a device which can save driver time and money, and the inconvenience of using booster cables or calling a tow truck; and to provide such a device which can help drivers to reduce the risk of rear end collisions.

DRAWING FIGURES

FIG. 1 shows a perspective veiw of an electronic multi-purpose device according to the invention.

FIG. 2 shows a block diagram of the device electronics.

FIG. 3 shows an electronic circuit schematic of the device and its external connection.

DRAWING REFERENCE NUMERALS

1 insulated metal clip
2 red electrical wire
3 black insulated metal clip
4 black electrical wire
5 bare metal clip
6 green electrical wire
7 buzzer
8 light emitting device
9 electronic circuit board
10 plastic box

DESCRIPTION

FIG. 1 shows an over-all construction of the warning device according to the preferred embodiment of the invention. The device comprises an insulated metal clip 1 to connect an insulated electrical wire 2 to the positive battery cable clamp or positive post of a rechargeable storage battery in a motor vehicle, a metal clip 3 to connect an electrical wire 4 to the negative battery cable clamp or negative post of said battery, a metal clip 5 to connect an electrical wire 6 to the chassis of the motor vehicle, a buzzer 7 as an audio warning means, a light emitting diode as a visual warning means, a printed circuit board 9 on which said electrical wires are connected and electrical components are mounted, a small box 10 preferably made of plastic for enclosing circuit board 9.

The main building blocks of the electronic circuitry on circuit board 9 are shown in FIG. 2, which comprises a Reference Voltage Circuit, a Voltage Sensing Circuit to compare a battery voltage to a reference voltage, a warning light, a Current Sensing Circuit to sense a voltage drop on the negative side of the battery and compare it to a reference voltage, a Delay Network to delay the Current Sensing Circuit action, a Schmitt Trigger Circuit to be used as a voltage comparator with hysteresis, a Driver Circuit, and a means for Warning Sound.

The detailed circuit of each building block in FIG. 2 is shown in FIG. 3. The Reference Voltage Circuit comprises a resistor R1 and a zener diode VR1 of about 5.1V reference. The Voltage Sensing circuits comprises an integrated comparator circuit U1, a resistor R2, a potentiometer R4, a polarized capacitor C1, and diodes CR1 and CR2. The Warning Light comprises a light emitting diode LED1 and a resistor R3. Resistor R3 is common to both Voltage Sensing Circuit and Warning Light. The Current Sensing Circuit comprises an integrated comparator circuit U2, a potentiometer R6, resistors R7 to R9, and diodes CR3 to CR4. The Delay Network comprises a resistor R11 and a capacitor C2. The Schmitt Trigger Circuit comprises an integrated comparator circuit U3 and resistors R12, R13. The Driver comprises a bipolar PNP transistor Q1 and resistors R5, R14. The Warning Sound is an electronic or electro-mechanical buzzer designated by DS1 in the circuit schematic.

Integrated comparator circuits U1, U2, U3 can share a common dual-in-line package normally called as a Quad Comparators Integrated Circuit similar to the LM 339.

FIG. 3 also shows external connections from the circuit Power Supply voltage V+ to the battery positive, from the circuit common ground to the battery negative, and from the current sensing network R9-R10 to the chassis of a motor vehicle whereas the battery is mounted.

OPERATION

The warning device of FIG. 1 will perform a wide variety of warning functions including low battery warning, headlamps on warning, brake light failure warning, inoperative battery charging system warning, bad battery connection warning, engine idle speed monitoring and battery charging system malfunction warning, etc..

For low battery and bad batter connection warning functions, the device electronics operate as follows: The Voltage Sensing Circuit constantly senses the battery voltage and compare it to a reference voltage. When the battery voltage falls below a working level, the Voltage Sensing Circuit will turn on the warning light and sound. Normally, integrated comparator U1 in FIG. 3 is at its maximum positive output state, preventing light emitting diode LED1 and transistor Q1 from conducting. When the cable connection at one or both battery posts are corroded or dirty, or during the engine starting of any non-electrical motor vehicles, battery voltage V+ will drop considerably. Potentiometer R4 is so adjusted that when V+ drops to just below a safe limit, U1 output will immediately switch from a maximum positive voltage to nearly ground level, making LED1 lit and Q1 conduct. When Q1 conducts, it will drive buzzer DS1 with enough current to make it sound. When LED1 conducts, the positive input of U1 remains to be equal or less than the voltage drop across LED1, even when battery voltage V+ already swings back up to a normal level after the engine has run. Since the voltage drop across light emitting diode LED1 is much less than reference voltage Vref, the output voltage of U1 is kept latched to nearly ground, the LED1 thus will remain lit and the buzzer will keep on sounding. This is to drive the driver attention until he or she goes to disconnect and reconnect the connecting clip 3 in FIG. 1.

For brake light failure, inoperative battery charging system and headlamps on warning functions, the device electronics operate as follows: Because the chassis of any motor vehicles or motorboats is always used as a ground or power return for almost all of the electrical functions, there must be a small voltage drop between the battery negative post and the chassis each time there is a current flowing to or from the battery. The Current Sensing Circuit will sense this voltage drop and its polarity. A positive voltage drop is caused by an outgoing current or battery discharge which is normally not a desirable condition in a motor vehicle. This discharge is in turn caused by an inoperative battery charging system, by any lamp or electrical equipment left on while the engine is not running. When the current of such a discharge exceeds a threshold limit preadjusted by potentiometer R10, the Current Sensing Circuit will immediately switch its output from nearly ground level to a maximum positive voltage, triggering Schmitt Trigger Circuit to change its output state from maximum positive to ground, Q1 then conducts and buzzer DS1 sounds.

For engine idle speed monitoring and battery charging system malfunction warning function, the device electronics operate as follows: When most of the electrical equipment in a motor vehicle are turned on, the battery charging voltage sometimes becomes less than the battery voltage itself, causing thus a battery discharge that may undesirably turn on the warning sound buzzer. To prevent this, a Delay Network has been included to delay the action of integrated comparator U2. However, when there is a malfunction in the battery charging system, the charging voltage may intermittently become so low that resistor R11 can have enought time to charge C2 up to a level that will turn U3 output to ground, and buzzer DS1 will then sound intermittently. This intermittency is used as one of the warning sign modes.

I claim:

1. A method for monitoring and indicating the conditions of a plurality of electrical functions and compnen in a motor vehicle or motorboat, comprising the steps of:
   (a) automatically sensing the discharge current of a storage battery used in a motor vehicle or motorboat by means of sensing an equivalent voltage drop signal caused by said discharge current;
   (b) automatically comparing said voltage drop signals to a preset value of an adjustable reference voltage by means of a voltage comparator;
   (c) automatically indicating the result of the comparison with a first indicator means to provide an audio warning indication when said voltage drop signal exceeds the preset value of said adjustable reference voltage;
   (d) determining a low-charge battery voltage hereinafter referred to as a cut-off voltage at which the vehicle starting motor can only be cranked very slowly but still be able to start the engine;
   (e) deriving from the voltage between the positive and negative battery cables or clamps by which the battery terminals are connected to the load a fixed reference voltage which remains constant independently of the battery load conditions and is at a lesser voltage than said cut-off voltage, said voltage between the battery cables or clamps being referred hereinafter as supply voltage;
   (f) deriving from said supply voltage a first voltage which varies proportionally with the battery voltage under different load conditions;
   (g) storing the value of said first voltage to a first capacitor to discharge from its initially stored value down to an actual value of said first voltage during engine start-up is equal to the time for the battery current to stabilize after initial loading of said battery by a starting motor;
   (h) applying said fixed reference voltage to an inverting input of a latching/voltage comparator and said first voltage to a noninverting input of said latching voltage comparator, and adjusting said first voltage to such a value that at battery voltage equal to/or less than said cut-off voltage, the output terminal of said latching voltage comparator is driven toward ground level;
   (i) automatically indicating the comparison result from said latching voltage comparator with said first indicator means and with a light emitting diode as a second indicator means to provide a combined audio-visual warning indication when the output of said latching voltage comparator is driven toward ground level;

(j) connecting the electrodes of said light emitting diode to the inverting input and the output terminal of said latching voltage comparator such that when said output terminal is driven toward ground level, said light emitting diode conducts and latches said output terminal to ground whereby said first indicator means and said light emitting diode as a second visual indicator means are also latched to their "on" state until the applying power is removed;

(k) protecting said voltage comparator, said latching voltage comparator, and said indicator means against a connection to the battery cables or battery cable clamps when in wrong polarity.

2. A method according to claim 1 wherein said sensing of the battery discharge current is done by sensing a voltage drop between the vehicle metal body or chasis to which the negative battery cable is connected and the negative battery cable or clamp, said voltage drop being linearly proportional to the battery discharge current which flows from the positive battery terminal to the load and then to the vehicle chasis and back to the negative battery terminal.

3. A method according to claim 1 wherein said adjustable reference voltage is derived from a wiper arm of a variable resistor across which said fixed reference voltage is applied.

4. A method according to claim 1 wherein said supply voltage is also derived from the battery terminals when the conditions of electrical connection between the battery cable clamps and the battery terminals are checked.

5. A method according to claim 1 wherein said first indicator means is connected to said voltage comparator via a delay network, a Schmitt Trigger, and a Driver.

6. A method according to claim 5 wherein said delay network comprises a resistor connected in series with a second capacitor, the junction point of said resistor and said second capacitor being connected to the output terminal of said latching voltage comparator.

7. A method according to claim 5 wherein said Schmitt Trigger has its inverting input connected to the output terminal of said voltage comparator and its output connected to said Driver.

8. A method according to claim 5 wherein said Driver comprises a transistor having its base connected to the output terminal of said voltage comparator and said latching voltage comparator each via a current limiting resistor, and its collector connected to said first indicator means.

9. An apparatus for monitoring and indicating the conditions of a plurality of electrical functions and components in a motor vehicle or motorboat, comprising:

(a) first connecting means for electrically connecting the apparatus to a positive battery cable or clamp by which the positive battery terminal is connected to the load, and for providing a voltage hereinafter referred to as a supply voltage which, when there is a contact resistance developed between said cable clamp and said battery terminal, is at a lesser voltage than the battery voltage;

(b) second connecting means for electrically connecting the apparatus to a negative battery cable, or clamp by which the negative battery terminals is connected to the load, and for providing a power return path hereinafter referred to as a ground reference;

(c) a third connecting means for electrically connecting the apparatus to the vehicle metal chassis or body to which the negative battery cable is connected;

(d) a voltage reference source being connected between said supply voltage and said ground reference to provide a fixed reference voltage;

(e) whereby said fixed reference voltage is at a lesser voltage than a low-charge battery voltage hereinafter referred to as a cut-off voltage at which the vehicle starting motor can only be cranked very slowly but still be able to start the engine;

(f) a first circuit means connected between said first reference voltage and an input end of said third connecting means to sense a voltage drop which is linearly proportional to the battery discharge current;

(g) a second circuit means connected between said fixed reference voltage and ground to provide and adjustable reference voltage;

(h) a voltage comparator having a switching action and its first input connected to the output terminal of said first circuit means, and its second input connected to the output terminal of said second circuit means;

(i) a delay network connected to the output terminal of said voltage comparator to render siad voltage comparator irresponsive to strong input noise;

(j) a Schmitt Trigger having its inverting input connected to the output terminal of said voltage comparator to stabilize the switching action of said voltage comparator;

(k) a first indicator means connected to the output terminal of said Schmitt Trigger via a driver transistor to provide an audio warning indicator when said voltage drop which is caused by the battery discharge current exceeds a preset value of said adjustable reference voltage;

(l) a first relative voltage divider consisting of a first resistor connected in series with a first variable resistor which provides from its wiper arm a first voltage that varies proportionally with the battery voltage under different load conditions, the other end of said first resistor being connected to said supply voltage and the other end of said first variable resistor being connected to said ground reference;

(m) a first capacitor connected acrosss the wiper arm of said first variable resistor and ground for storing the value of said first voltage, the value of said first capacitor is such that the time for said first capacitor to discharge from its initially stored value down to an actual value of said first voltage during engine start-up is equal to the time for the battery current to stabilize after initial loading of said battery by a starting motor;

(n) a latching voltage comparator having its inverting input connected to said fixed reference voltage via a second resistor and its noninverting input connected to said first voltage, and a light emitting diode connected in a feedback loop; said first voltage being adjusted to such a value that a battery voltage equal to or less than said cut-off voltage, the output terminal of said latching voltage comparator being driven toward ground;

(o) whereby the electrodes of said light emitting diode are connected between the output terminal and the input of said latching voltage comparator such that when said output terminal is driven toward ground level, said light emitting diode conducts and latches said output terminal to ground whereby said first indicator means and said light emitting diode as a second visual indicator means are also latched to their "on" state until the applying power is removed;

(p) whereby power supply for said voltage comparator, said latching voltage comparator, said driver, said first indicator, and said second indicator is taken from said supply voltage;

(q) a third circuit means for protecting the apparatus against a connection to the battery cables or clamps when in reversed polarity.

10. An apparatus according to claim 9 wherein said first, second and third connecting means are electrical wires having clips for attachment to said battery cable or clamps and said vehicle metal body or chassis.

11. An apparatus according to claim 9 wherein said first and second connecting means are also connected to the battery terminals when the conditions of connection of said battery cable clamps to said battery terminals are checked.

12. An apparatus according to claim 10 wherein said electrical wires are also used to attach the apparatus to a battery cable.

13. An apparatus according to claim 9 wherein said voltage reference source comprises a third resistor connected in series with a voltage breakdown device.

14. An apparatus according to claim 9 wherein said first circuit means comprises a second resistive voltage divider having a fourth resistor connected in series with a fifth resistor being taken as the output terminal of said first circuit means for providing a second voltage, the other end of said fifth resistor being connected to the input terminal of said third connecting means.

15. An apparatus according to claim 14 wherein said second voltage includes a voltage drop between the vehicle metal body or chassis to which said third connecting means is connected and ground reference, said voltage drop being lineraly proportional to the battery discharge current that flows from the positive battery terminal to the load and returns to the negative battery terminal by way of the vehicle chassis.

16. An apparatus according to claim 9 wherein said second circuit means comprises a second variable resistor connected between said fixed reference voltage and ground and a third resistive voltage divider connected across the wiper arm of said second variable resistor and ground, said second variable resistor being adjusted to provide said adjustable reference voltage at the output terminals of said third resistive voltage divider.

17. An apparatus according to claim 9 wherein said voltage comparator has input polarity means connected such that when the battery discharge current exceeds a preset limit, said voltage drop will cause said voltage comparator to be driven from ground toward supply voltage.

18. An apparatus according to claim 9 wherein said third circuit means comprises four diodes having their anodes connected to ground and their cathodes connected separately to each input of aid voltage comparator and said latching voltage comparator.

* * * * *